US012670739B2

(12) United States Patent
Nagano et al.

(10) Patent No.: US 12,670,739 B2
(45) Date of Patent: Jun. 30, 2026

(54) TECHNIQUES FOR VERIFYING USER IDENTITIES DURING COMPUTER-MEDIATED INTERACTIONS

(71) Applicant: NVIDIA CORPORATION, Santa Clara, CA (US)

(72) Inventors: Koki Nagano, Playa Vista, CA (US); David Luebke, Charlottesville, VA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/186,000

(22) Filed: Mar. 17, 2023

(65) Prior Publication Data

US 2024/0046687 A1 Feb. 8, 2024

Related U.S. Application Data

(60) Provisional application No. 63/394,448, filed on Aug. 2, 2022.

(51) Int. Cl.
| | |
|---|---|
| *G06V 40/10* | (2022.01) |
| *G06F 21/31* | (2013.01) |
| *G06F 21/32* | (2013.01) |
| *G06T 13/20* | (2011.01) |
| *G06T 13/40* | (2011.01) |
| (Continued) | |

(52) U.S. Cl.
CPC .............. *G06V 40/10* (2022.01); *G06F 21/31* (2013.01); *G06F 21/32* (2013.01); *G06T 13/205* (2013.01); *G06T 13/40* (2013.01); *G06T 13/80* (2013.01); *G06V 10/40* (2022.01); *G06V 10/751* (2022.01);
(Continued)

(58) Field of Classification Search
CPC ....... G06F 21/31; G06F 21/32; G06T 13/205; G06T 13/40; G06T 13/80; G06V 10/40; G06V 10/751; G06V 10/761; G06V 40/10; G06V 10/806; G06V 40/172
See application file for complete search history.

(56) References Cited

U.S. PATENT DOCUMENTS

| | | | | |
|---|---|---|---|---|
| 2010/0214057 A1* | 8/2010 | Alvord | ..................... | G01S 19/14 |
| | | | | 340/5.2 |
| 2016/0134840 A1* | 5/2016 | McCulloch | .......... | G06V 40/165 |
| | | | | 348/14.03 |

(Continued)

FOREIGN PATENT DOCUMENTS

| | | | | | |
|---|---|---|---|---|---|
| EP | | 3779967 A1 * | 2/2021 | ............. | G10L 15/22 |
| WO | WO-2020154865 A1 * | | 8/2020 | ........... | H04L 45/745 |

OTHER PUBLICATIONS

Cozzolino et al., "ID-Reveal: Identity-aware DeepFake Video Detection", arXiv:2012.02512, Dec. 4, 2021, pp. 1-13.

(Continued)

*Primary Examiner* — Cory A Almeida
(74) *Attorney, Agent, or Firm* — Artegis Law Group, LLP

(57) ABSTRACT

Techniques are disclosed herein for verifying user identities. The techniques include generating one or more features based on at least one of video data or audio data generated during a computer-mediated interaction between a plurality of users in which a first user included in the plurality of users is represented by an avatar, and verifying an identity of the first user based on the one or more features that are generated and one or more features associated with the first user.

20 Claims, 10 Drawing Sheets

(51) Int. Cl.

| | | |
|---|---|---|
| *G06T 13/80* | (2011.01) | |
| *G06V 10/40* | (2022.01) | |
| *G06V 10/74* | (2022.01) | |
| *G06V 10/75* | (2022.01) | |
| *G06V 10/80* | (2022.01) | |
| *G06V 40/16* | (2022.01) | |

(52) U.S. Cl.
CPC .......... *G06V 10/761* (2022.01); *G06V 10/806* (2022.01); *G06V 40/172* (2022.01)

(56) References Cited

U.S. PATENT DOCUMENTS

| | | | |
|---|---|---|---|
| 2020/0098354 A1* | 3/2020 | Lin | .......................... G10L 15/22 |
| 2020/0242717 A1* | 7/2020 | Agarwal | .................. G06F 16/28 |
| 2021/0264395 A1* | 8/2021 | Trelin | .................. G06Q 20/206 |

OTHER PUBLICATIONS

Wu et al., "Eulerian Video Magnification for Revealing Subtle Changes in the World", Association for Computing Machinery, http://dx.doi.org/10.1145/2185520.2185561, ACM Transactions on Graphics, vol. 31, No. 4, Jul. 1, 2012, pp. 1-8.

Koluguri et al., "Titanet: Neural Model for Speaker Representation With 1D Depth-Wise Separable Convolutions and Global Context", arXiv:2110.04410, Oct. 8, 2021, 5 pages.

Agarwal et al., "Protecting World Leaders Against Deep Fakes", CVPR, 2019, pp. 38-45.

Agarwal et al., "Detecting Deep-Fake Videos from Aural and Oral Dynamics", CVPR, 2021, 9 pages.

Wikipedia, "Fingerprint (Computing)", Retrieved from https://en.wikipedia.org/wiki/Fingerprint_(computing), on Mar. 27, 2023, 3 pages.

* cited by examiner

Features 308

Fingerprint Module 402

Fingerprint 404

Auxiliary Information 408

Auxiliary Information Module 406

Fingerprint and Auxiliary Information 410

Encryption Module 412

Encrypted Fingerprint and Auxiliary Information 414

Fingerprint Generator 310

From 802

804

Compute distance or loss between features and stored features associated with authorized user — 1002

Verify user identity based on the distance or loss — 1004

To 806

TECHNIQUES FOR VERIFYING USER IDENTITIES DURING COMPUTER-MEDIATED INTERACTIONS

CROSS-REFERENCE TO RELATED APPLICATIONS

This application claims priority benefit of the U.S. Provisional Patent Application titled, "IDENTITY-SIGNED MODEL FOR PREVENTING AUDIO AND VISUAL DEEPFAKES," filed on Aug. 2, 2022, and having Ser. No. 63/394,448. The subject matter of this related application is hereby incorporated herein by reference.

BACKGROUND

Technical Field

Embodiments of the present disclosure relate generally to user verification and computer science and, more specifically, to techniques for verifying user identities during computer-mediated interactions.

Description of the Related Art

In computer-mediated interactions, avatars are controlled, or "driven," by users to interact with other users. An avatar is an electronic representation of a user that can be manipulated by the user. For example, rather than sharing video and audio of a user during a videoconference, the user could choose to share an avatar that is generated from the video and audio using artificial intelligence (AI) synthesis techniques. In such cases, the avatar could be controlled to perform similar actions as the user in the video and audio.

One drawback of computer-mediated interactions is that, because an avatar is presented to other users, those other users cannot see the person who is controlling the avatar. Accordingly, the other users have no direct means of ascertaining the identity of the user who is controlling the avatar. In addition, no effective techniques currently exist for verifying the identity of a user who controls an avatar during a computer-mediated interaction. The inability to identify and/or verify the identities of users during computer-mediated interactions enables nefarious users to impersonate other users by controlling the avatars of those other users.

As the foregoing illustrates, what is needed in the art are more effective techniques for verifying user identities during computer-mediated interactions.

SUMMARY

Some embodiments of the present disclosure set forth a computer-implemented method for verifying user identities. The method includes generating one or more features based on at least one of video data or audio data generated during a computer-mediated interaction between a plurality of users in which a first user included in the plurality of users is represented by an avatar. The method further includes verifying an identity of the first user based on the one or more features that are generated and one or more features associated with the first user.

Other embodiments of the present disclosure include, without limitation, one or more computer-readable media including instructions for performing one or more aspects of the disclosed techniques as well as one or more computing systems for performing one or more aspects of the disclosed techniques.

At least one technical advantage of the disclosed techniques relative to the prior art is that the disclosed techniques enable the identities of users who control avatars during computer-mediated interactions to be verified, thereby improving security and trust during the computer-mediated interactions. In addition, the disclosed techniques enable remedial actions to be taken when the identities of users are not verified during computer-mediated interactions. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

General Overview

Embodiments of the present disclosure provide techniques for verifying user identities during computer-mediated interactions. In some embodiments, features are extracted from video and/or audio data of a user during a computer-mediated interaction in which the user controls, or "drives," an avatar that is presented to other users. The features are compared with features associated with a known user, who is permitted to control the avatar, in order to verify that the identity of the user captured in the video and/or audio data is the known user. The extracted features and the features associated with the known user can be compared directly, or fingerprints generated from the extracted features and the features associated with the known user can be compared. Remedial actions, such as notifying the other users that the identity of the user has not been verified or preventing the user from controlling the avatar, can be taken when the identity of the user is not verified.

The techniques disclosed herein for verifying user identities have many real-world applications. For example, those techniques could be used to verify the identities of users who control avatars in a videoconference. As another example, those techniques could be used to verify the identities of users who control avatars in the metaverse.

The above examples are not in any way intended to be limiting. As persons skilled in the art will appreciate, as a general matter, the techniques for verifying user identities can be implemented in any suitable application.

System Overview

Figure 1:
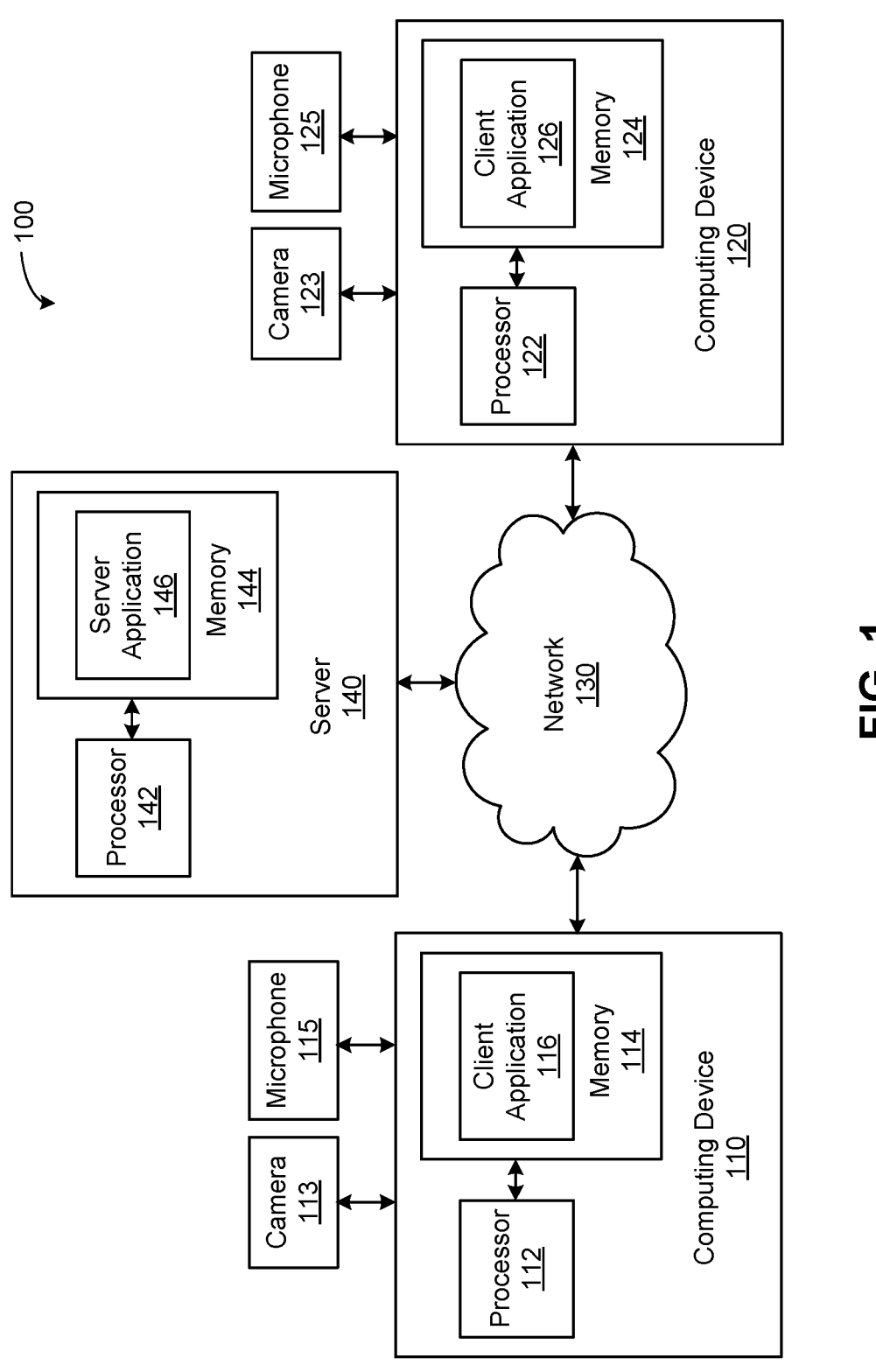
FIG. 1 is a block diagram illustrating a computer system configured to implement one or more aspects of the various embodiments.

FIG. 1 illustrates a system 100 configured to implement one or more aspects of the various embodiments. As shown, the system 100 includes a server device 140 (also referred to herein as "server 140"), two computing devices 110 and 120, a camera 113 and a microphone 115 that are connected to the computing device 110, and a camera 123 and a microphone 125 that are connected to the computing device 120. Illustratively, the computing devices 110 and 120 and the server 140 are in communication over a network 130. In some embodiments, the network 130 can be a wide area network (WAN) such as the Internet, a local area network (LAN), or any other technically feasible network. In some embodiments, the server 140 is a server machine operating in a data center or a cloud computing environment that provides scalable computing resources as a service over a network.

As shown, a client application 116 executes on a processor 112 of the computing device 110 and is stored in a system memory 114 of the computing device 110. The processor 112 receives user input from input devices, such as a keyboard or a mouse. In operation, the processor 112 is the master processor of the computing device 110, controlling and coordinating operations of other system components. In particular, the processor 112 can issue commands that control the operation of a graphics processing unit (GPU) (not shown) that incorporates circuitry optimized for graphics and video processing, including, for example, video output circuitry. The GPU can deliver pixels to a display device that can be any conventional cathode ray tube, liquid crystal display, light-emitting diode display, or the like.

The system memory 114 of the computing device 110 stores content, such as software applications and data, for use by the processor 112 and the GPU. The system memory 114 can be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) can supplement or replace the system memory 114. The storage can include any number and type of external memories that are accessible to the processor 112 and/or the GPU. For example, and without limitation, the storage can include a Secure Digital Card, an external Flash memory, a portable compact disc read-only memory (CD-ROM), an optical storage device, a magnetic storage device, or any suitable combination of the foregoing.

It will be appreciated that the computing device 110 shown herein is illustrative and that variations and modifications are possible. For example, the number of processors 112, the number of GPUs, the number of system memories 114, and the number of applications included in the system memory 114 can be modified as desired. Further, the connection topology between the various units in FIG. 1 can be modified as desired. In some embodiments, any combination of the processor 112, the system memory 114, and a GPU can be replaced with any type of virtual computing system, distributed computing system, or cloud computing environment, such as a public, private, or a hybrid cloud.

A client application 126 executes on a processor 122 of the computing device 120 and is stored in a system memory 124 of the computing device 120. In addition, a server application 146 executes on a processor 142 of the server 140 and is stored in a system memory 144 of the server 140. In some embodiments, the processors 122 and 142 and the system memories 124 and 144 of the computing device 120 and the server 140 are similar to the processor 112 and the system memory 114, respectively, of the computing device 110. In some embodiments, the client application 116 executing on the computing device 110, the client application 126 executing on the computing device 120, and the server application 146 executing on the server 140 facilitate a live, computer-mediated interaction between a user of the computer device 110 and a user of the computer device 120. For example, the client applications 116 and 126 could be videoconferencing clients that facilitate a videoconference in which at least one user controls an avatar to interact with one or more other users. As another example, the client applications 116 and 126 could be metaverse clients that facilitate interactions within a metaverse in which at least one user controls an avatar. During a computer-mediated interaction, avatars can be transmitted rather than video and audio data of a user for various reasons, such as privacy, beautification filtering, maintaining eye contact during videoconferences, lowering bandwidth usage, translating between languages, etc. In some embodiments, the client application 116, the client application 126, and/or the server application 146 perform techniques to verify the identity of at least one user who controls an avatar during a computer-mediated interaction, as discussed in greater detail below in conjunction with FIGS. 3-10.

Figure 2:
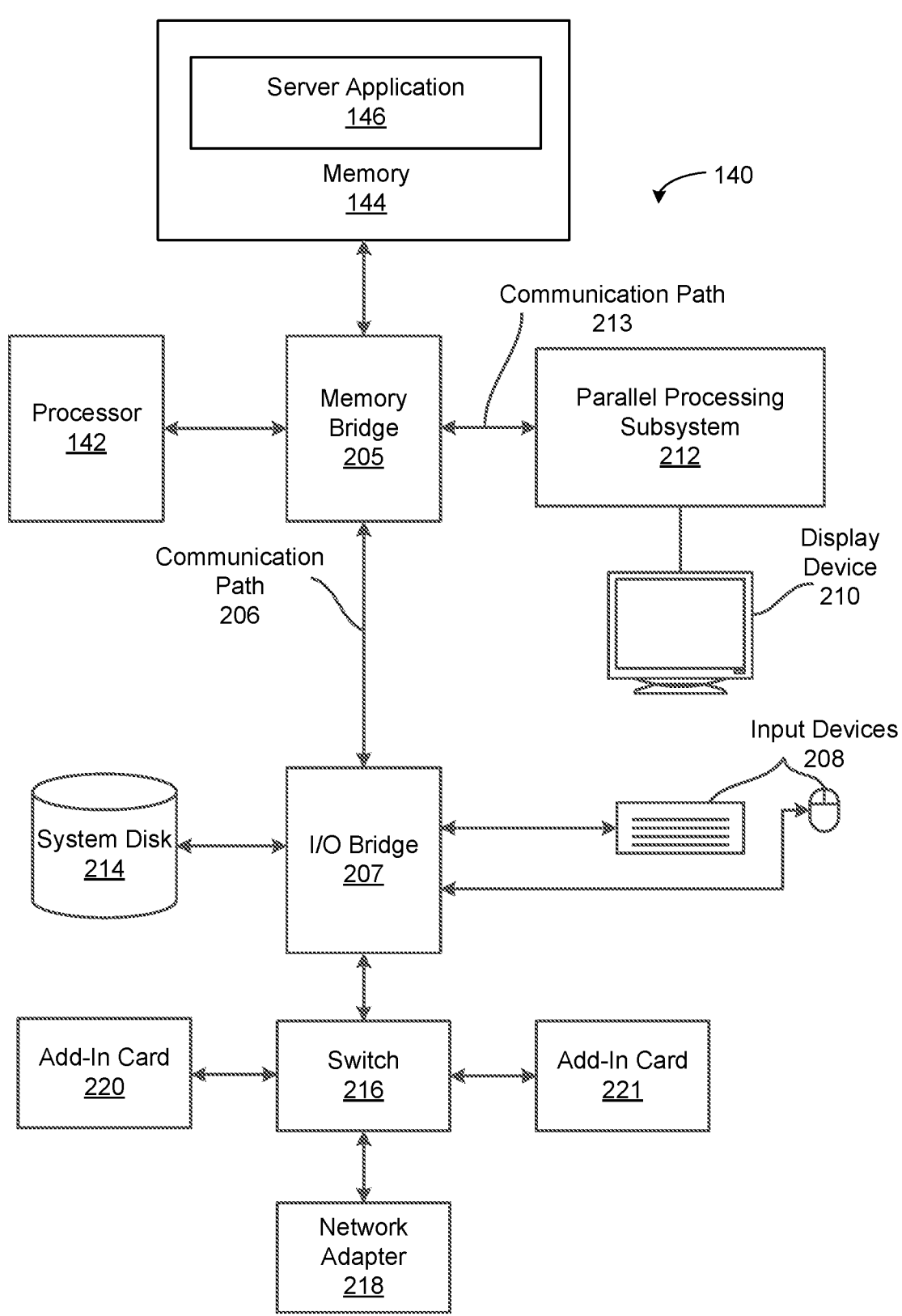
FIG. 2 is a more detailed illustration of one of the computing devices of FIG. 1, according to various embodiments.

FIG. 2 is a more detailed illustration of the server 140 of FIG. 1, according to various embodiments. As persons skilled in the art will appreciate, the server 140 can be any type of technically feasible computer system, including, without limitation, a server machine, a server platform, a desktop machine, a laptop machine, a hand-held/mobile device, or a wearable device. In some embodiments, the computing devices 110 and 120 can include similar components as the server 140.

In various embodiments, the server 140 includes, without limitation, the processor 142 and the memory 144 coupled to a parallel processing subsystem 212 via a memory bridge 205 and a communication path 206. Memory bridge 205 is further coupled to an I/O (input/output) bridge 207 via a communication path 206, and I/O bridge 207 is, in turn, coupled to a switch 216.

In some embodiments, I/O bridge 207 is configured to receive user input information from optional input devices 208, such as a keyboard or a mouse, and forward the input information to processor 142 for processing via communication path 206 and memory bridge 205. In some embodiments, server 140 may be a server machine in a cloud computing environment. In such embodiments, server 140 may not have input devices 208. Instead, server 140 may receive equivalent input information by receiving commands in the form of messages transmitted over a network and received via the network adapter 218. In some embodiments, switch 216 is configured to provide connections between I/O bridge 207 and other components of the server 140, such as a network adapter 218 and various add-in cards 220 and 221.

In some embodiments, I/O bridge 207 is coupled to a system disk 214 that may be configured to store content and applications and data for use by processor 142 and parallel processing subsystem 212. In some embodiments, system disk 214 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 207 as well.

In various embodiments, memory bridge 205 may be a Northbridge chip, and I/O bridge 207 may be a Southbridge chip. In addition, communication paths 206 and 213, as well as other communication paths within server 140, may be implemented using any technically suitable protocols, including, without limitation, AGP (Accelerated Graphics Port), HyperTransport, or any other bus or point-to-point communication protocol known in the art.

In some embodiments, parallel processing subsystem 212 comprises a graphics subsystem that delivers pixels to an optional display device 210 that may be any conventional cathode ray tube, liquid crystal display, light-emitting diode display, or the like. In such embodiments, the parallel processing subsystem 212 incorporates circuitry optimized for graphics and video processing, including, for example, video output circuitry. Such circuitry may be incorporated across one or more parallel processing units (PPUs), also referred to herein as parallel processors, included within parallel processing subsystem 212. In some other embodiments, the parallel processing subsystem 212 incorporates circuitry optimized for general purpose and/or compute processing. Again, such circuitry may be incorporated across one or more PPUs included within parallel processing subsystem 212 that are configured to perform such general purpose and/or compute operations. In some other embodiments, the one or more PPUs included within parallel processing subsystem 212 may be configured to perform graphics processing, general purpose processing, and compute processing operations. The system memory 144 includes at least one device driver configured to manage the processing operations of the one or more PPUs within parallel processing subsystem 212. In addition, the system memory 144 includes the server application 146, described above in conjunction with FIG. 1.

In various embodiments, the parallel processing subsystem 212 may be integrated with one or more of the other elements of FIG. 2 to form a single system. For example, the parallel processing subsystem 212 may be integrated with the processor 142 and other connection circuitry on a single chip to form a system on chip (SoC).

In some embodiments, the processor 142 is the master processor of the server 140, controlling and coordinating operations of other system components. In some embodiments, the processor 142 issues commands that control the operation of PPUs. In some embodiments, communication path 213 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of processors (e.d., processor 142), and the number of parallel processing subsystems 212, may be modified as desired. For example, in some embodiments, the system memory 144 could be connected to the processor 142 directly rather than through memory bridge 205, and other devices would communicate with the system memory 144 via the memory bridge 205 and the processor 142. In other embodiments, the parallel processing subsystem 212 may be connected to the I/O bridge 207 or directly to the processor 142, rather than to the memory bridge 205. In still other embodiments, the I/O bridge 207 and the memory bridge 205 may be integrated into a single chip instead of existing as one or more discrete devices. In certain embodiments, one or more components shown in FIG. 2 may not be present. For example, the switch 216 could be eliminated, and the network adapter 218 and the add-in cards 220, 221 would connect directly to the I/O bridge 207. Lastly, in certain embodiments, one or more components shown in FIG. 2 may be implemented as virtualized resources in a virtual computing environment, such as a cloud computing environment. In particular, the parallel processing subsystem 212 may be implemented as a virtualized parallel processing subsystem in some embodiments. For example, the parallel processing subsystem 212 could be implemented as a virtual graphics processing unit (GPU) that renders graphics on a virtual machine (VM) executing on a server machine whose GPU and other physical resources are shared across multiple VMs.

Verifying User Identities during Computer-Mediated Interactions

Figure 3:
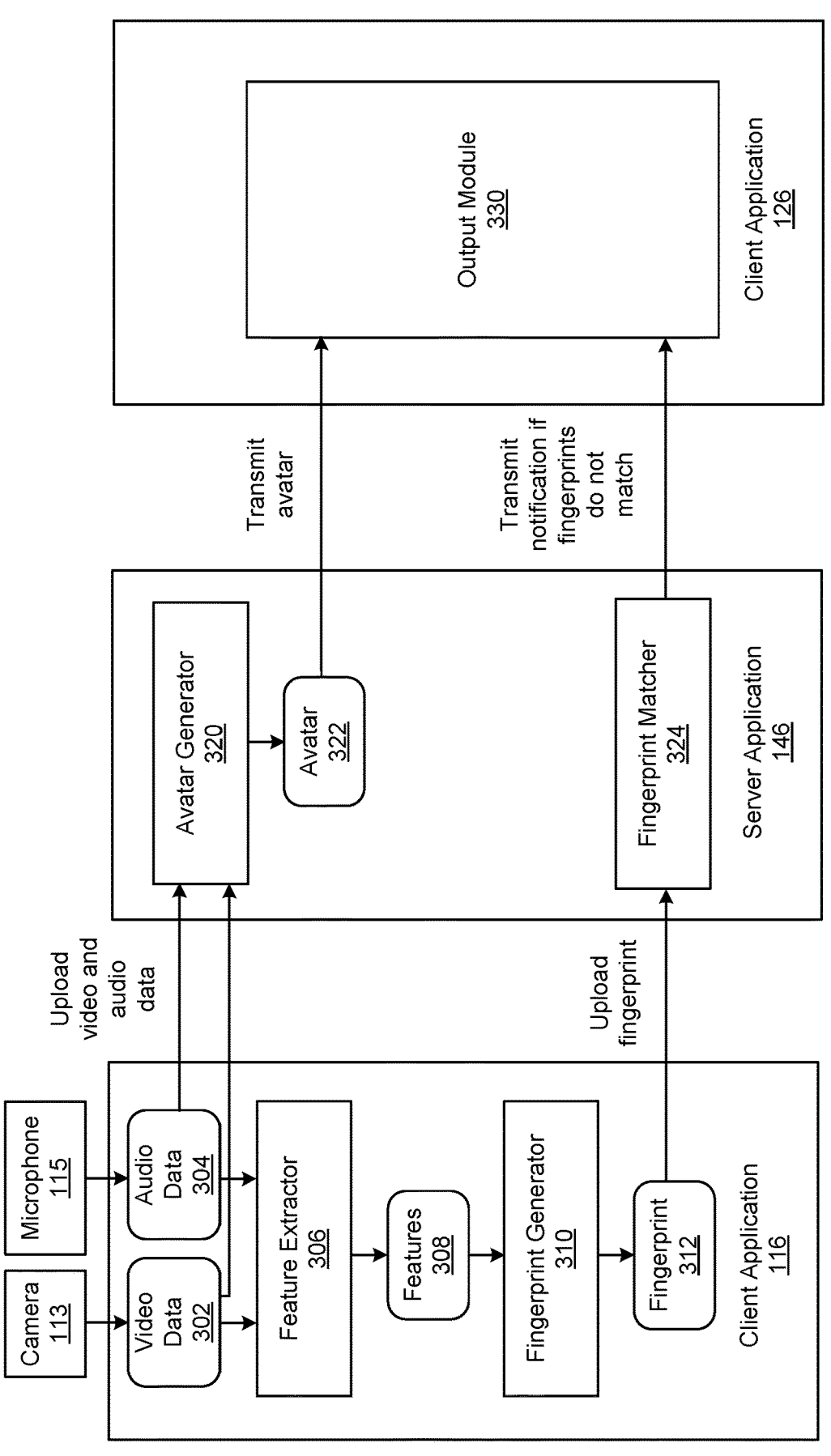
FIG. 3 is a more detailed illustration of the client and server applications of FIG. 1, according to various embodiments.

FIG. 3 is a more detailed illustration of the client applications 116 and 126 and the server application 146 of FIG. 1, according to various embodiments. As shown, the client application 116 includes a feature extractor module 306 (also referred to herein as "feature extractor 306") and a fingerprint generator module 310 (also referred to herein as "fingerprint generator 310"). In operation, the client application 116 receives video data 302 captured by the camera 113 and audio data 304 acquired by the microphone 115 during a live, computer-mediated interaction. As described, in some embodiments, the computer-mediated interaction can be, for example, a videoconference or metaverse interaction during which one or more users are represented by avatars controlled by the user(s). In some embodiments, users that employ a text-to-speech (TTS) system to control avatars can be required to turn on a camera that records video data. Illustratively, the client application 116 uploads the video data 302 and the audio data 304 to the server application 146 for processing by an avatar generator module 320 (also referred to herein as "avatar generator 320"), discussed in greater detail below.

The feature extractor 306 of the client application 116 processes the video data 302 and the audio data 304 to generate features 308. In some embodiments, any suitable features can be generated by the feature extractor 306 in any technically feasible manner, including using known techniques. In some embodiments, the features can include spatial-temporal features that generalize user mannerisms in video and/or audio data, which have proven to be useful for user identification and are sometimes referred to as "soft biometrics." In some embodiments, the feature extractor 306 can generate soft biometric features that include image feature(s), video feature(s), face performance tracking feature(s), and/or audio feature(s). Examples of image features include biometric features, such as an ear shape, iris color, etc. of a user captured in one or more frames of the video data 302. Examples of video features include physiological signals such as deep motion features that represent learned temporal mannerisms, body gestures, heartbeats, etc. of a user captured in the video data 302. As specific examples, how different muscles of a user activate, head poses of the user, how often the user blinks and raises his or her eyebrows, how much the jaw of the user moves during speech, etc. are features that can be used to create a soft biometric model of the user. Examples of face performance tracking features include facial landmarks; face action units; six-dimensional (6D) head poses that include yaw, roll, pitch, and translations; etc. of the face of a user captured in the video data 302. As a specific example, landmark detection techniques could be applied to determine the coordinates of facial landmarks of the user within the frames of a video. Examples of audio features include speaker identity features generated by a machine learning model given the audio data 304, and/or low level features such as pitch, intensity, and performance of a user whose voice is recorded in the audio data 304. Although described herein primarily with respect to extracting features from both video and audio data (e.g., video data 302 and audio data 304), in some embodiments, features can be extracted from only video data or only audio data that is used to generate an avatar, and an identity of the user can be verified based on the extracted features.

Figure 4:
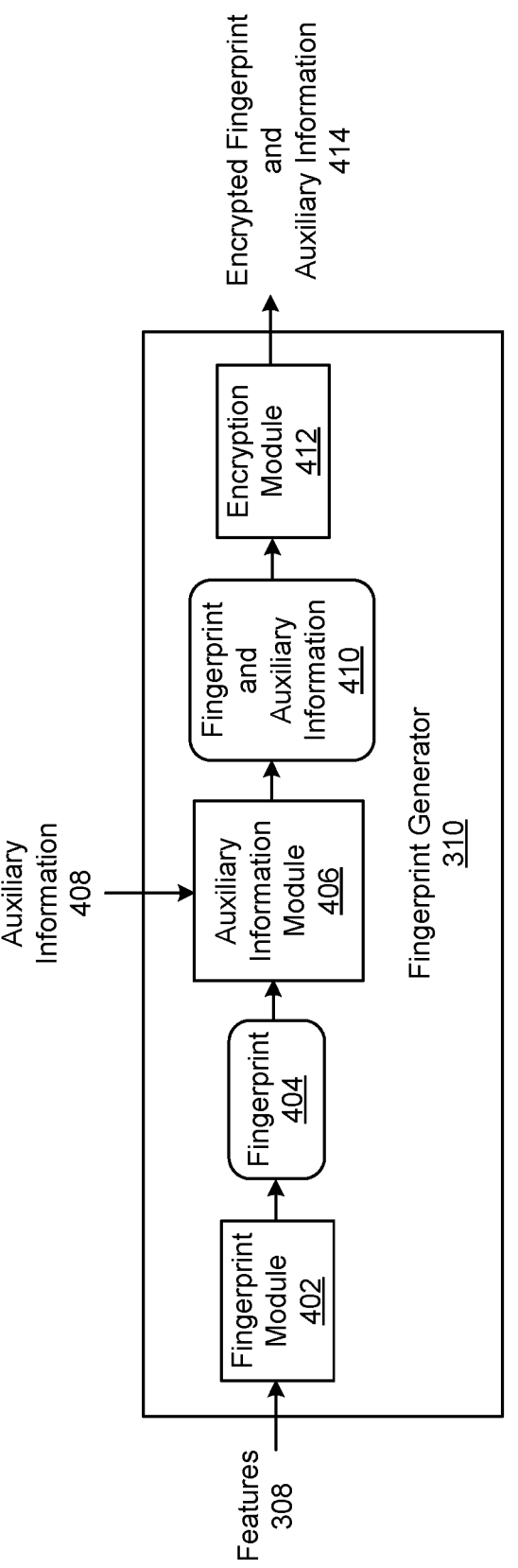
FIG. 4 is a more detailed illustration of the fingerprint generator of FIG. 3, according to various embodiments.

The fingerprint generator 310 processes the features 308 to generate a fingerprint 312, which includes less data than the original features 308 but uniquely identifies the features 308. Then, the client application 116 transmits the fingerprint 312 to the server application 146 for processing by a fingerprint matcher module 324 (also referred to herein as "fingerprint matcher 324"), discussed in greater detail below. FIG. 4 is a more detailed illustration of the fingerprint generator 310 of FIG. 3, according to various embodiments. As shown, the fingerprint generator 310 includes a fingerprint module 402, an auxiliary information module 406, and an encryption module 412. In operation, the fingerprint generator 310 takes as input the features 308 generated by the feature extractor 306. The fingerprint module 402 processes the features 308 to generate a fingerprint 404. The fingerprint module 402 can process the features 308 in any technically feasible manner in some embodiments. For example, in some embodiments, the fingerprint module 402 can hash the features 308 to generate a hash that is used as the fingerprint 404.

The auxiliary information module 406 receives the fingerprint 404 generated by the fingerprint module 402, as well as auxiliary information 408, as input. In some embodiments, the auxiliary information 408 can include information associated with the computing device 110 on which the client application 116 runs, such as an identifier (ID) of the computing device 110 and/or component(s) (e.g., a processor or GPU) thereof; information associated with the camera 113 and/or the microphone 115, such as IDs thereof or cryptographic signatures generated by the camera 113 and/or the microphone 115, that are used to acquire the video data 302 and/or the audio data 304; and/or a geographical location associated with the computing device 110. The auxiliary information module 406 combines the fingerprint 404 with the auxiliary information 408 to generate fingerprint and auxiliary information 410. For example, in some embodiments, the auxiliary information module 406 can append (i.e., concatenate) the auxiliary information 408 to the fingerprint 404 to generate the fingerprint and auxiliary information 410. Although described herein primarily with respect to combining auxiliary information with a fingerprint by appending the auxiliary information to the fingerprint, in some embodiments, the auxiliary information can be included within the fingerprint or provided as a sideband to the fingerprint.

The encryption module 412 encrypts the fingerprint and auxiliary information 410 to generate encrypted fingerprint and auxiliary information 414, which is then transmitted to the server application 146 for processing by the fingerprint matcher 324. In some embodiments, any technically feasible encryption technique, such as known encryption algorithms, can be applied to encrypt the fingerprint and auxiliary information 410.

Returning to FIG. 3, the server application 146 receives the video data 302 and the audio data 304, as well as the fingerprint 312, that are transmitted by the client application 116 to the server application 146. In some embodiments, the transmitted fingerprint 312 includes the encrypted fingerprint and auxiliary information 414, described above in conjunction with FIG. 4. As shown, the server application 146 includes the avatar generator 320 and the fingerprint matcher 324. In operation, the avatar generator 320 takes as input the video data 302 and the audio data 304 of a user, and the avatar generator 320 generates an avatar representation 322 (also referred to herein as "avatar 322") of the user based on the video data 302 and the audio data 304. In some embodiments, the avatar representation 322 can include video and/or audio data of an avatar that moves and/or speaks in a similar manner as the user moves and/or speaks in the video data 302 and/or the audio data 304, respectively. For example, in some embodiments, video and/or audio data of an avatar can be generated by processing the video data 302 and/or the audio data 304 of the user via one or more generative machine learning models that generate the video and/or audio data of the avatar. In some embodiments, the avatar representation 322 can be a realistic representation of the user in the video data 302 and the audio data 304. In some other embodiments, the avatar representation 322 can be a stylized representation (e.g., a cartoon) of the user in the video data 302 and the audio data 304.

After the avatar generator 320 generates the avatar representation 322, the server application 146 transmits the avatar representation 322 to the client application 126. As shown, the client application 126 includes an output module 330 that causes the avatar representation 322 to be output to a user of the computing device 120. When the avatar representation 332 includes video data and/or audio data of an avatar, the output module 330 can, in some embodiments, cause the video data to be output via one or more display devices and/or the audio data to be output via one or more speaker devices. Although a single output module 330 is shown for illustrative purposes, in some embodiments, functionality of the output module 330 can be implemented in any number of modules, such as separate modules for video and audio output.

In parallel to the avatar generator 320 generating the avatar representation 322, the fingerprint matcher 324 processes the fingerprint 312 to verify an identity of the user captured in the video data 302 and audio data 304. In some embodiments, the fingerprint matcher 324 matches the fingerprint 312 against a fingerprint that is generated from features associated with a user who is authorized to control the avatar. In some embodiments, authorized users can include a user represented by the avatar, which is sometimes also referred to as "self reenactment," and/or other user(s) who are not represented by the avatar, which is sometimes also referred to as "cross reenactment." For example, a celebrity could control his or her own avatar, as well as register other users that are then authorized to control the avatar. The features associated with the authorized user can be obtained in any technically feasible manner in some embodiments. For example, in some embodiments, the features associated with the authorized user can be features that are extracted, by the feature extractor 306, from video and audio data acquired during an onboarding session after a user creates an account used to control the avatar. In such cases, the user can be instructed to perform certain actions and/or say certain things during the onboarding session, after which features can be extracted from video and audio data acquired during the onboarding session and registered with the server application 146. As another example, in some embodiments, the features associated with the authorized user can be extracted from video and audio data during the normal course of computer-mediated interactions (e.g., the first few hours during which a user controls an avatar), without a separate onboarding process. In some embodiments, the features associated with the authorized user are stored, and a fingerprint can then be computed based on the stored features. In some embodiments, a fingerprint is computed from features associated with the authorized user, and the fingerprint is stored.

If the fingerprint 312 matches the fingerprint that is generated from features associated with an authorized user, then the identity of the user is verified. On the other hand, if the fingerprint 312 does not match the fingerprint that is generated from the features associated with an authorized user, then the identity of the user is not verified. It should be noted that the defending side has an asymmetric advantage over attackers trying to impersonate other users, because video and audio features, as well as fingerprints generated from such features, are relatively easy to analyze in real time but much more difficult to "synthesize" in real time.

When the identity of the user is not verified by the fingerprint matcher 324, the server application 146 transmits a notification to the client application 126 that the identity of the user has not been verified. In some embodiments, the output module 330 of the client application 126 causes the notification to be output to the other user. For example, in some embodiments a notification can be displayed along with a video of the avatar 322 that is received from the server application 146. In such cases, any technically feasible form of notification can be displayed, such as a warning sign, a red light, a text notification, etc. Although described herein primarily with respect to transmitting and outputting a notification when the identity of a user is not verified, in some embodiments, a notification can additionally or alternatively be transmitted and output when the identity of a user is verified. For example, in some embodiments, a checkmark, green light, etc. can be displayed as the notification that a user identity has been verified.

Although described above with respect to transmitting a notification as a reference example, in some embodiments, other remedial actions can be taken in addition to, or in lieu of, transmitting a notification if the identity of a user captured in the video data 302 and audio data 304 is not verified by the fingerprint matcher 324. For example, in some embodiments, the server application 146 does not transmit the avatar 322 to the client application 126 if the identity of the user is not verified by the fingerprint matcher 324. As another example, in some embodiments, the server application 146 stops permitting the user to control the avatar 322 if the identity of the user is not verified by the fingerprint matcher 324.

Although described above with respect to generating a fingerprint based on features extracted from video and/or audio data and matching the fingerprint to a fingerprint generated from features associated with an authorized user, in some embodiments, the features can be compared directly with features associated with an authorized user, without computing fingerprints. For example, in some embodiments, a distance or a loss can be computed between the features extracted from video and/or audio data and stored features associated with an authorized user to match a user in the video and/or audio data with the authorized user, as discussed in greater detail below in conjunction with FIG. 10.

Figure 5:
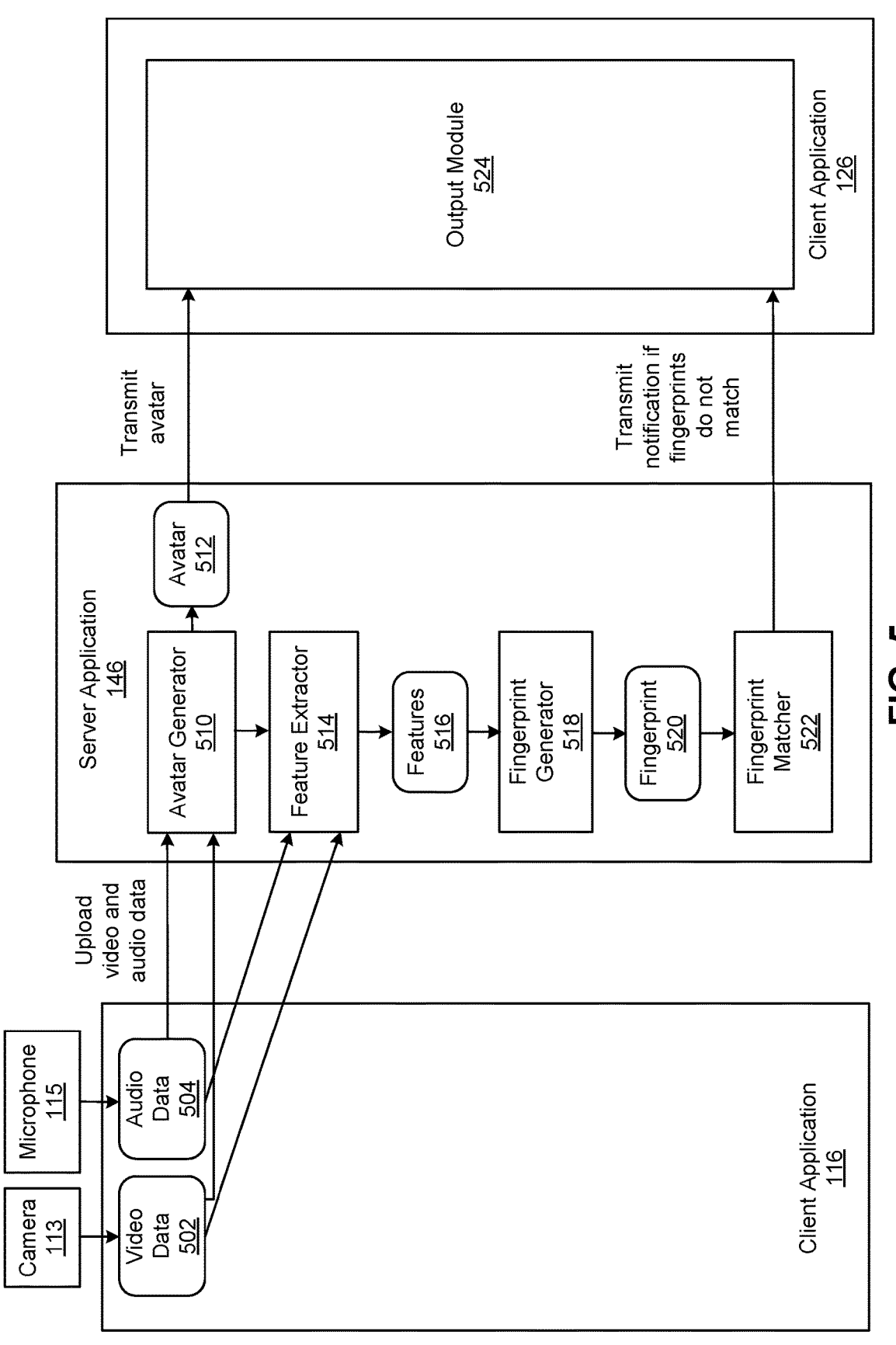
FIG. 5 is a more detailed illustration of the client and server applications of FIG. 1, according to various other embodiments.

FIG. 5 is a more detailed illustration of the client applications 116 and 126 and the server application 146 of FIG. 1, according to various other embodiments. As shown, in some embodiments, the client application 116 uploads video data 502 and audio data 504 that are acquired by the camera 113 and the microphone 115, respectively, to the server application 146. The server application 146 includes an avatar generator 510, a feature extractor 514, a fingerprint generator 518, and a fingerprint matcher 522. The avatar generator 510, the feature extractor 514, the fingerprint generator 518, and the fingerprint matcher 522 are similar to the avatar generator 320, the feature extractor 306, the fingerprint generator 310, and the fingerprint matcher 324, respectively, that are described above in conjunction with FIG. 3. However, the feature extractor 514 and the fingerprint generator 518 are implemented in the server application 146, rather than in the client application 116, to generate features 516 and a fingerprint 520, respectively. In some embodiments, each module, such as the feature extractor 514 and the fingerprint generator 518, can be implemented in the client application 116, the server application 146, or the client application 126, depending on various considerations such as computational resources available on the computing device 110 to perform feature extraction, fingerprint generation, and avatar generation; how much uploading bandwidth is available; etc. Some other implementations of the modules are described below in conjunction with FIGS. 6-7.

Illustratively, the fingerprint matcher 522 matches the fingerprint 520 against a fingerprint that is generated from features associated with an authorized user who is permitted to control the avatar, and an identity of the user captured in the video data 502 and audio data 504 is verified if the fingerprints match. If the fingerprints do not match, the server application 146 transmits a notification that the identity of the user has not been verified to the client application 126, which can output the notification to a user of the client device 120, similar to the description above in conjunction with FIG. 3. Additionally or alternatively, in some embodiments, the server application 146 can take other remedial actions if the identity of the user is not verified based on the matching of fingerprints, similar to the description above in conjunction with FIG. 3.

Figure 6:
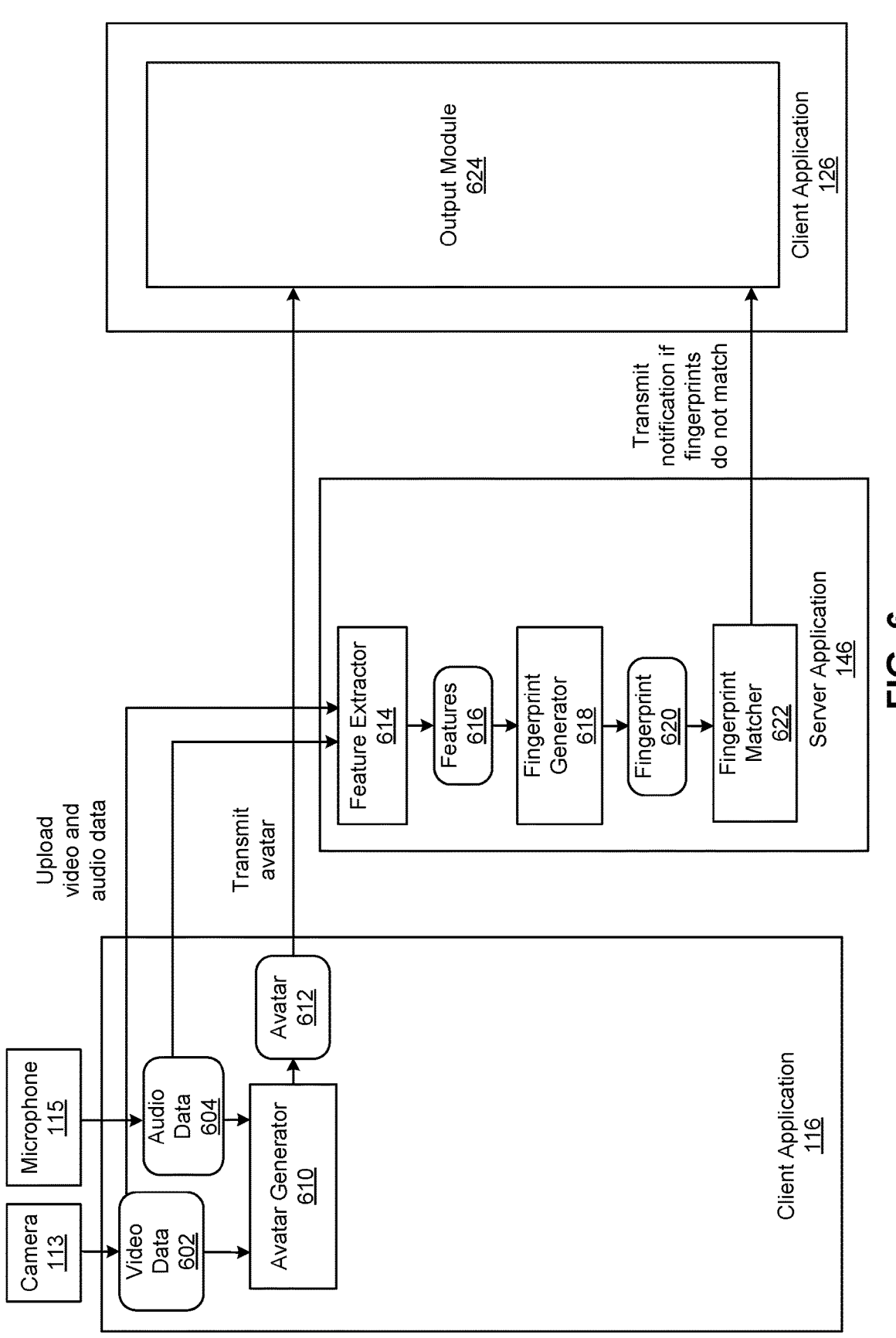
FIG. 6 is a more detailed illustration of the client and server applications of FIG. 1, according to various other embodiments.

FIG. 6 is a more detailed illustration of the client applications 116 and 126 and the server application 146 of FIG. 1, according to various other embodiments. As shown, in some embodiments, the client application 116 uploads video data 602 and audio data 604 that are acquired by the camera 113 and the microphone 115, respectively, to the server application 146. The client application 116 also includes an avatar generator 610 that generates an avatar 612 that is transmitted directly to the client application 126.

The server application 146 brokers a connection between the client applications 116 and 126 by, for example, performing handshaking and a hand off. In addition, the server application 146 serves as a sidecar application that verifies an identity of the user captured in the video data 602 and audio data 604 by generating features 616, generating a fingerprint 620 from the features 616, and determining whether the fingerprint 620 matches a fingerprint that is generated from features for a user who is authorized to control the avatar. Illustratively, the server application 146 includes a feature extractor 614, a fingerprint generator 618, and a fingerprint matcher 622. The avatar generator 610, the feature extractor 614, the fingerprint generator 618, and the fingerprint matcher 622 are similar to the avatar generator 320, the feature extractor 306, the fingerprint generator 310, and the fingerprint matcher 324, respectively, that are described above in conjunction with FIG. 3. However, the avatar generator 610 is implemented in the client application 116, rather than in the server application 146, to generate the avatar 612 that is transmitted to the client application 126. If the fingerprint matcher 622 determines that the fingerprint 620 generated from extracted features 616 does not match a fingerprint that is generated from features for a user who is authorized to control the avatar, then the identity of the user is not verified. In such a case, the server application 146 transmits a notification that the identity of the user has not been verified to the client application 126, which can output the notification to a user of the client device 120, similar to the description above in conjunction with FIG. 3. Additionally or alternatively, in some embodiments, the server application 146 can take other remedial actions if the identity of the user is not verified based on the matching of fingerprints, similar to the description above in conjunction with FIG. 3.

In some embodiments, to protect the privacy of the user in the video data 602 and audio data 604 and/or due to limited uploading bandwidth, the feature extractor 614 and fingerprint generator 618 can be implemented in the client application 116. In such cases, the client application 116 uploads a fingerprint to the server application 146, rather than the video data 602 and audio data 604, and the fingerprint matcher 622 verifies the user by comparing the uploaded fingerprint to a fingerprint that is generated from features for a user who is authorized to control the avatar.

Figure 7:
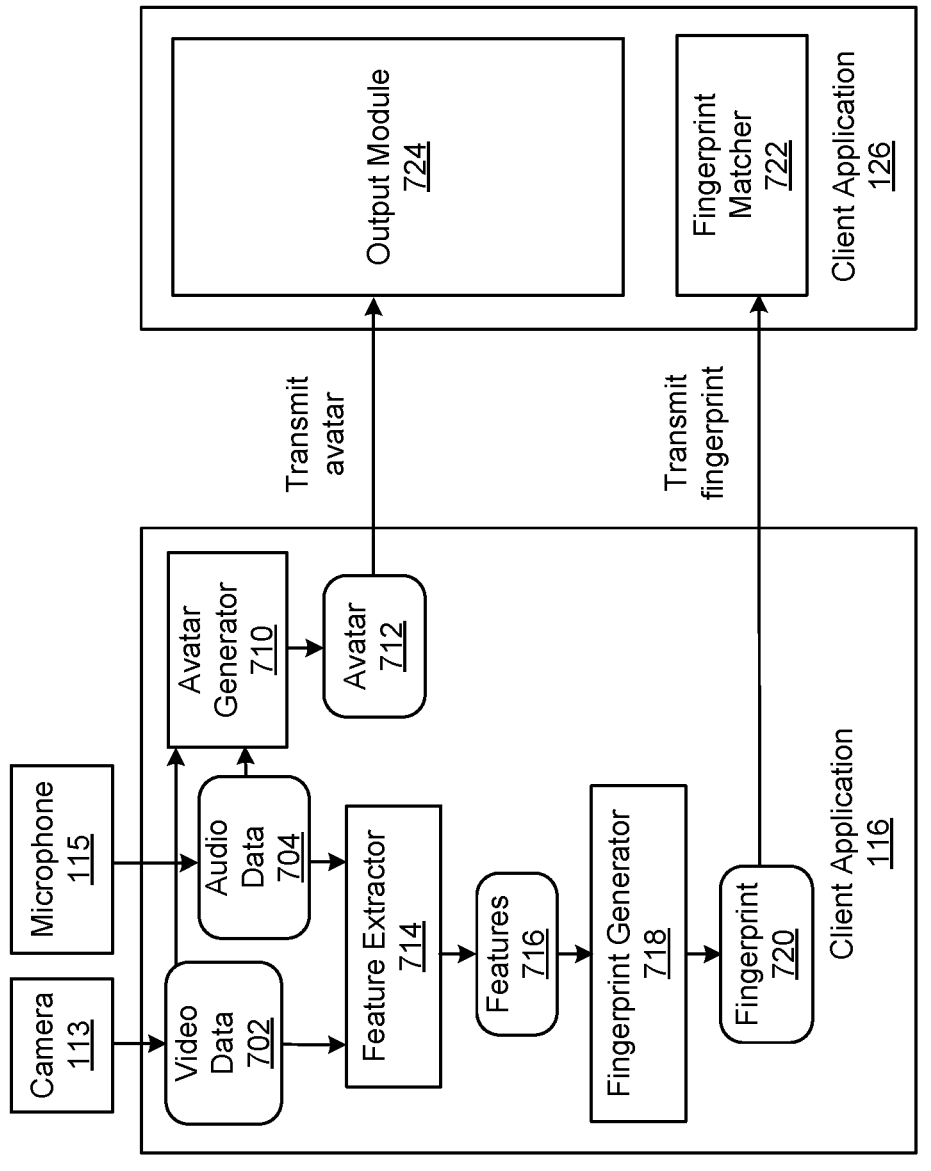
FIG. 7 is a more detailed illustration of the client and server applications of FIG. 1, according to various other embodiments.

FIG. 7 is a more detailed illustration of the client applications 116 and 126 of FIG. 1, according to various other embodiments. As shown, in some embodiments, the client application 116 includes an avatar generator 710, a feature extractor 714, and a fingerprint generator 718. The client application 126 includes a display module 724 and a fingerprint matcher 722. The avatar generator 710, feature extractor 714, fingerprint generator 718, display module 724, and fingerprint matcher 722 are similar to the avatar generator 320, feature extractor 306, fingerprint generator 310, display module 330, and fingerprint matcher 324, described above in conjunction with FIG. 3. However, the server application 146 is not required because the client application 116 includes the avatar generator 710 that generates an avatar 712 that is transmitted to the client application 126. In addition, the fingerprint generator 718 generates a fingerprint 720 from features 716 generated by the feature extractor 714, and the client application 116 transmits the fingerprint 720 directly to the client application 126. The client application 126 includes the fingerprint match 722 that determines whether the fingerprint 720 matches a fingerprint that is generated from features for an authorized user. The features for the authorized user and/or the fingerprint of such features can be obtained in any technically feasible manner. For example, the features, or a fingerprint of such features, could be transmitted to the client application 126 at an earlier time. As another example, the features, or a fingerprint of such features, could have previously been uploaded to a blockchain, from which the client application 126 downloaded the features or fingerprint of the features.

If the fingerprint 720 does not match the fingerprint that is generated from features for the authorized user, then an identity of the user is not verified by the fingerprint matcher 722. In such a case, the output module 724 of the client application 126 causes a notification that the identity of the user has not been verified to be output to a user of the client device 120, similar to the description above in conjunction with FIG. 3. Additionally or alternatively, in some embodiments, the client application 126 can take other remedial actions if the identity of the user is not verified based on the matching of fingerprints, similar to the description above in conjunction with FIG. 3.

Although described herein primarily with respect to extracting features from video and/or audio data (e.g., video data 702 and audio data 704) of a user, in some embodiments, features can be extracted from an avatar representation itself. For example, in some embodiments, the client application 126 can extract features from video and/or audio data of an avatar and compare such features, or a fingerprint generated from the features, to features associated with an avatar being controlled by an authorized user, or a fingerprint generated from such features associated the avatar being controlled by the authorized user.

Figure 8:
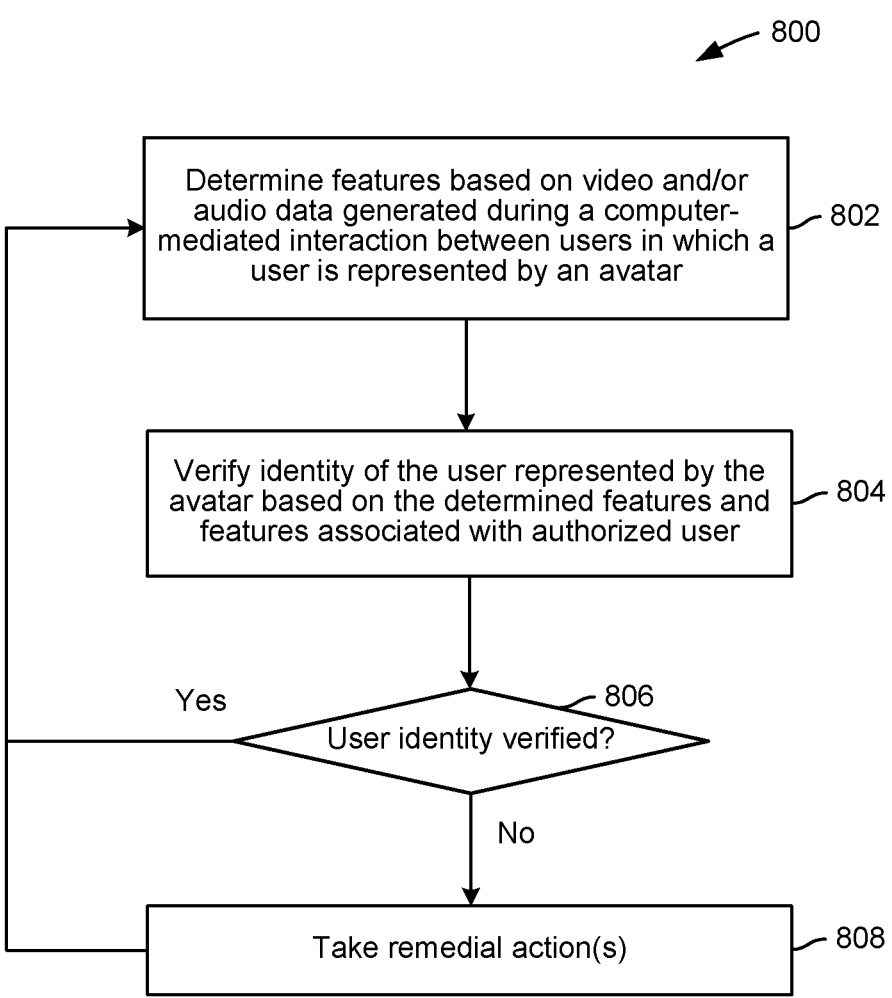
FIG. 8 is a flow diagram of method steps for verifying the identity of a user during a computer-mediated interaction, according to various embodiments.

FIG. 8 is a flow diagram of method steps for verifying the identity of a user during a computer-mediated interaction, according to various embodiments. Although the method steps are described in conjunction with the system of FIGS. 1-7, persons skilled in the art will understand that any system configured to perform the method steps in any order falls within the scope of the present embodiments. Although the method steps are described as being performed by the server application 146, in some embodiments, the some or all of the method steps can be performed, in part or in whole, by one or more client applications, as described above in conjunction with FIGS. 3 and 7.

As shown, a method 800 begins at step 802, where the server application 146 determines features based on video and/or audio data generated during a computer-mediated interaction between users in which at least one user is represented by an avatar. For example, in some embodiments, the computer-mediated interaction can be a videoconference in which at least one user controls an avatar during the videoconference. As another example, in some embodiments, the computer-mediated interaction can be an interaction in which at least one user controls an avatar within a metaverse. Although described with respect to the server application 146 performing step 802, in some embodiments, a client application can determine features based on video and/or audio data generated during a computer-mediated interaction, as described above in conjunction with FIGS. 3 and 7.

At step 804, the server application 146 verifies the identity of a user represented by an avatar based on the features determined at step 802 and features associated with a user who is authorized to control the avatar. In some embodiments, the server application 146 verifies the user identity by generating a fingerprint based on the features determined at step 802 and comparing the fingerprint with a fingerprint generated based on features associated with the user who is authorized to control the avatar, as discussed in greater detail below in conjunction with FIG. 9. In such cases, the server application 146 can generate the fingerprint based on stored features associated with the authorized user, or such a fingerprint could have previously been generated and stored. In some embodiments, the server application 146 verifies the user identity by directly comparing the features determined at step 802 with stored features associated with the user who is authorized to control the avatar, as discussed in greater detail below in conjunction with FIG. 10.

At step 806, if the identity of the user is verified by the server application 146, then the method 800 returns to step 802, where the server application 146 determines additional features based on additional video and/or audio data generated during the computer-mediated interaction. In some embodiments, user identity is verified continuously during the computer-mediated interaction. For example, in some embodiments, the user identity can be verified for every frame of video data that is captured. In some embodiments, user identity is verified periodically during the computer-mediated interaction. For example, in some embodiments, the user identity can be verified for a sliding window of frames of video data. In such cases, the user identity could be verified frequently enough (e.g., every minute or every few minutes) to achieve a certified level of protection.

On the other hand, if the identity of the user is not verified by the server application 146, then at step 808, the server application 146 takes one or more remedial actions. The remedial actions can include transmitting a notification to a client application (e.g., client application 126) that the user identity is not verified, not transmitting an avatar to the client application, preventing the user from controlling the avatar, a combination thereof, etc., as described above in conjunction with FIG. 3.

Figure 9:
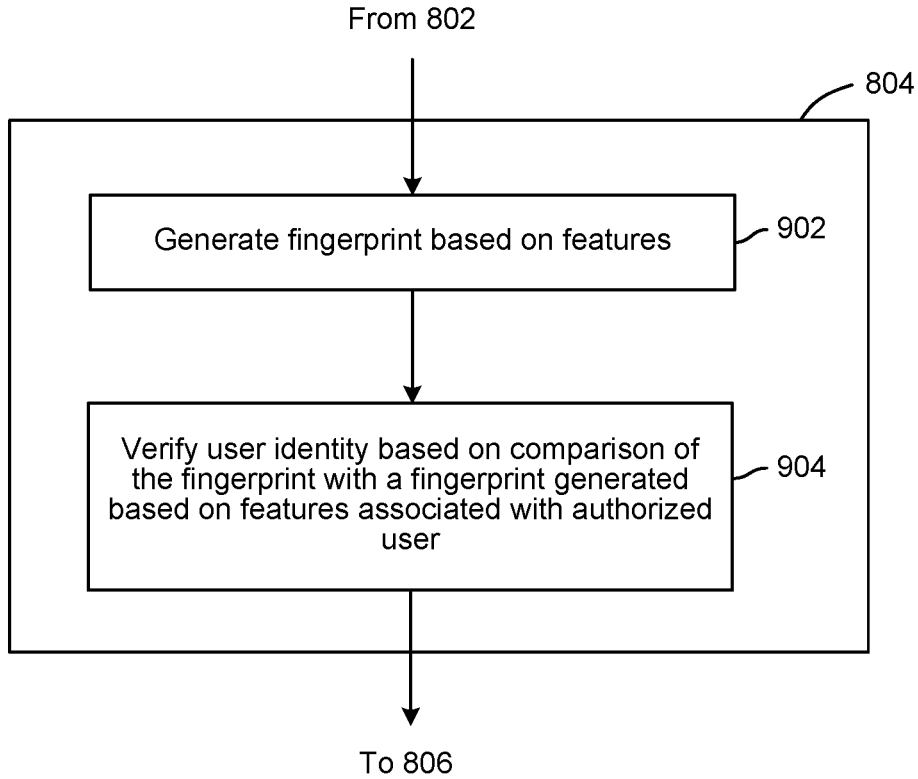
FIG. 9 is a flow diagram of method steps for verifying the identity of a user based on features associated with the user, according to various embodiments.

FIG. 9 is a flow diagram of method steps for verifying the identity of a user based on features associated with the user, according to various embodiments. Although the method steps are described in conjunction with the system of FIGS. 1-7, persons skilled in the art will understand that any system configured to perform the method steps in any order falls within the scope of the present embodiments.

As shown, at step 902, the server application 146 generates a fingerprint based on the features determined at step 802. In some embodiments, the server application 146 can generate the fingerprint from the features in any technically feasible manner. In some embodiments, the server application 146 also appends auxiliary information to the fingerprint. For example, in some embodiments, the server application 146 can append to the fingerprint an ID of the computing device of the user, IDs of the camera and/or the microphone that acquired video and/or audio data, a geographical location associated with the computing device of the user, a combination thereof, etc. Although described with respect to the server application 146 performing step 902, in some embodiments, a client application can generate a fingerprint based on determined features, as described above in conjunction with FIGS. 3 and 6-7. In such cases, the client application can also encrypt the fingerprint for transmittal to the server application 146, as described above in conjunction with FIG. 4.

At step 904, the server application 146 verifies the user based on a comparison between the fingerprint generated at step 902 and a fingerprint generated based on features associated with a user who is authorized to control the avatar. As described, authorized users can include a user represented by the avatar ("self reenactment") and/or other user(s) who are not represented by the avatar ("cross reenactment"). In some embodiments, the server application 146 can perform any technically feasible fingerprint matching technique to compare the fingerprint generated at step 902 and the fingerprint generated based on features associated with the user who is authorized to control the avatar. In some embodiments, when multiple users are authorized to control the avatar, the fingerprint generated at step 902 is compared with fingerprints generated based on features associated with each of the authorized users. In some embodiments in which auxiliary information is appended to the fingerprint, the server application 146 also checks whether the auxiliary information matches stored information associated with an authorized user, such as stored information on the computing device ID, camera ID, microphone ID, and/or geographical location associated with the authorized user. Although described with respect to the server application 146 performing step 904, in some embodiments, a client application can verify the user based on a comparison between fingerprints, as described above in conjunction with FIG. 7.

Figure 10:
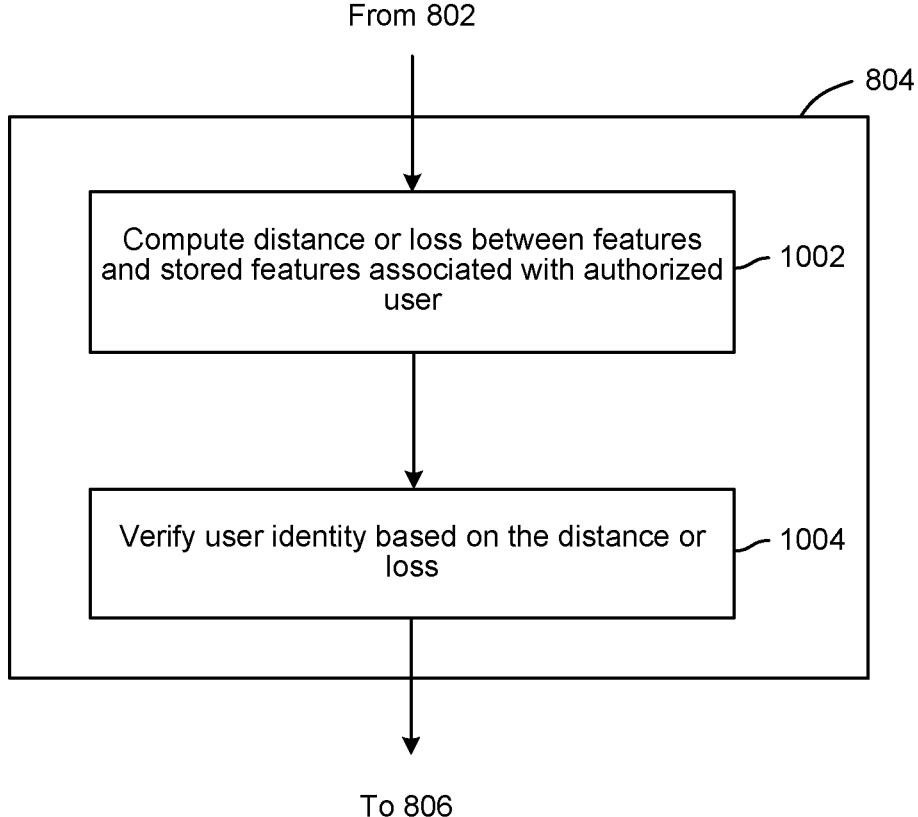
FIG. 10 is a flow diagram of method steps for verifying the identity of a user based on features associated with the user, according to various other embodiments.

FIG. 10 is a flow diagram of method steps for verifying the identity of a user based on features associated with the user, according to various other embodiments. Although the method steps are described in conjunction with the system of FIGS. 1-7, persons skilled in the art will understand that any system configured to perform the method steps in any order falls within the scope of the present embodiments. Although described with respect to the server application 146 performing steps 1002 and 1004, in some embodiments, a client application (e.g., client application 126) can perform steps 1002 and 1004.

As shown, at step 1002, the server application 146 computes a distance or a loss between the features determined at step 802 and stored features that are associated with the authorized user. For example, in some embodiments, the server application 146 can compute a Euclidean distance or a cosine distance between the features determined at step 802 and the stored features associated with the authorized user. As another example, in some embodiments, the server application 146 can compute an additive marginal loss between the features determined at step 802 and the stored features associated with the authorized user.

At step 1004, the server application 146 verifies the user based on the distance or the loss. For example, in some embodiments, the server application 146 can verify the user if the distance or the loss is less than a threshold distance or loss. Conversely, the server application 146 does not verify the user if the distance or the loss is greater than the threshold distance or loss.

In sum, techniques are disclosed for verifying user identities during computer-mediated interactions. In some embodiments, features are extracted from video and/or audio data of a user during a computer-mediated interaction in which the user controls an avatar that is presented to other users. The features are compared with features associated with a known user, who is permitted to control the avatar, in order to verify that the identity of the user captured in the video and/or audio data is the known user. The extracted features and the features associated with the known user can be compared directly, or fingerprints generated from the extracted features and the features associated with the known user can be compared. Remedial actions, such as notifying the other users that the identity of the user has not been verified or preventing the user from controlling the avatar, can be taken when the identity of the user is not verified.

At least one technical advantage of the disclosed techniques relative to the prior art is that the disclosed techniques enable the identities of users who control avatars during computer-mediated interactions to be verified, thereby improving security and trust during the computer-mediated interactions. In addition, the disclosed techniques enable remedial actions to be taken when the identities of users are not verified during computer-mediated interactions. These technical advantages represent one or more technological improvements over prior art approaches.

1. In some embodiments, a computer-implemented method for verifying user identities comprises generating one or more features based on at least one of video data or audio data generated during a computer-mediated interaction between a plurality of users in which a first user included in the plurality of users is represented by an avatar, and verifying an identity of the first user based on the one or more features that are generated and one or more features associated with the first user.

2. The computer-implemented method of clause 1, wherein verifying the identity of the first user comprises generating a first fingerprint based on the one or more features that are generated, and comparing the first fingerprint with a second fingerprint that is generated based on the one or more features associated with the first user.

3. The computer-implemented method of clauses 1 or 2, wherein verifying the identity of the first user comprises computing at least one of a distance or a loss based on the one or more features that are generated and the one or more features associated with the first user.

4. The computer-implemented method of any of clauses 1-3, wherein the avatar is controlled based on the at least one of video data or audio data during the computer-mediated interaction.

5. The computer-implemented method of any of clauses 1-4, wherein generating the one or more features comprises performing one or more operations to generate the one or more features based on the avatar.

6. The computer-implemented method of any of clauses 1-5, wherein the identity of the first user is further verified based on at least one of information associated with a computing device belonging to the first user, information associated with a sensor used to acquire the video data or the audio data, or a geographical location.

7. The computer-implemented method of any of clauses 1-6, further comprising receiving the at least one of video data or audio data from a first client application, and transmitting a notification to a second client application indicating whether the identity of the first user has been verified.

8. The computer-implemented method of any of clauses 1-7, further comprising receiving the at least one of video data or audio data from a first client application, generating an avatar representation of the first user based on the at least one of video data or audio data, and in response to verifying the identity of the first user, transmitting the avatar representation of the first user to a second client application.

9. The computer-implemented method of any of clauses 1-8, wherein each of the one or more features that are generated and the one or more features associated with the first user include at least one of an image feature, a video feature, a face performance tracking feature, or an audio feature.

10. The computer-implemented method of any of clauses 1-9, wherein the step of generating the one or more features is performed by an application running on either a client computing device or a server computing device.

11. In some embodiments, one or more non-transitory computer-readable media store program instructions that, when executed by at least one processor, cause the at least one processor to perform the steps of generating one or more features based on at least one of video data or audio data generated during a computer-mediated interaction between a plurality of users in which a first user included in the plurality of users is represented by an avatar, and verifying an identity of the first user based on the one or more features that are generated and one or more features associated with the first user.

12. The one or more non-transitory computer-readable media of clause 11, wherein verifying the identity of the first user comprises generating a first fingerprint based on the one or more features that are generated, and comparing the first fingerprint with a second fingerprint that is generated based on the one or more features associated with the first user.

13. The one or more non-transitory computer-readable media of clauses 11 or 12, wherein verifying the identity of the first user comprises computing at least one of a distance or a loss based on the one or more features that are generated and the one or more features associated with the first user.

14. The one or more non-transitory computer-readable media of any of clauses 11-13, wherein the avatar is driven based on the at least one of video data or audio data during the computer-mediated interaction.

15. The one or more non-transitory computer-readable media of any of clauses 11-14, wherein the identity of the first user is further verified based on at least one of information associated with a computing device belonging to the first user, information associated with a sensor used to acquire the video data or the audio data, or a geographical location.

16. The one or more non-transitory computer-readable media of any of clauses 11-15, wherein the instructions, when executed by the at least one processor, further cause the at least one processor to perform the steps of receiving the at least one of video data or audio data from a first client application, and transmitting a notification to a second client application indicating whether the identity of the first user has been verified.

17. The one or more non-transitory computer-readable media of any of clauses 11-16, wherein the identity of the first user is verified either continuously or periodically.

18. The one or more non-transitory computer-readable media of any of clauses 11-17, wherein the step of generating the one or more features is performed by a first application running on a client computing device, and the step of verifying the identity of the first user is performed by a second application running on a server computing device.

19. The one or more non-transitory computer-readable media of any of clauses 11-18, wherein the step of generating the one or more features is performed by a first application running on a first client computing device, and the step of verifying the identity of the first user is performed by a second application running on a second client computing device.

20. In some embodiments, a system comprises one or more memories storing instructions, and one or more processors that are coupled to the one or more memories and, when executing the instructions, are configured to generate one or more features based on at least one of video data or audio data generated during a corn puter-mediated interaction between a plurality of users in which a first user included in the plurality of users is represented by an avatar, and verify an identify of the first user based on the one or more features that are generated and one or more features associated with the first user.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for verifying user identities, the method comprising:

generating a plurality of first features associated with a first user based on video data generated during a computer-mediated interaction between a plurality of users in which the first user included in the plurality of users is represented by an avatar, wherein the plurality of first features is generated based on tracking one or more movements of the first user over time using the video data; and verifying an identity of the first user based on the plurality of first features and a prior version of the plurality of first features that is extracted from video data generated during at least one prior computer-mediated interaction associated with the first user and is generated based on tracking one or more prior movements of the first user, by:

generating a first hash value based on the one or more movements of the first user, wherein the first hash value uniquely identifies the plurality of first features and includes less data than the plurality of first features, appending auxiliary information to the first hash value to generate a combined data structure, the auxiliary information comprising a geographic location associated with a computing device used by the first user when the computer-mediated interaction occurs, encrypting the combined data structure to generate a first fingerprint, and comparing the first fingerprint with a second fingerprint, wherein the second fingerprint uniquely identifies the prior version of the plurality of first features associated with the first user and is generated based on the one or more prior movements of the first user.

2. The computer-implemented method of claim 1, wherein verifying the identity of the first user comprises computing at least one of a distance or a loss based on the plurality of first features and the prior version of the plurality of first features associated with the first user.

3. The computer-implemented method of claim 1, wherein the avatar is controlled based on at least one of the video data or audio data during the computer-mediated interaction.

4. The computer-implemented method of claim 1, wherein generating the plurality of first features comprises performing one or more operations to generate the plurality of first features based on the avatar.

5. The computer-implemented method of claim 1, wherein the identity of the first user is further verified based on at least one of information associated with a computing device belonging to the first user, information associated with a sensor used to acquire the video data or audio data, or a geographical location.

6. The computer-implemented method of claim 1, further comprising:
   receiving at least one of the video data or audio data from a first client application; and
   transmitting a notification to a second client application indicating whether the identity of the first user has been verified.

7. The computer-implemented method of claim 1, further comprising:
   receiving at least one of the video data or audio data from a first client application;
   generating an avatar representation of the first user based on the at least one of the video data or the audio data; and
   in response to verifying the identity of the first user, transmitting the avatar representation of the first user to a second client application.

8. The computer-implemented method of claim 1, wherein each of the plurality of first features and the prior version of the plurality of first features associated with the first user includes at least one of an image feature, a video feature, a face performance tracking feature, or an audio feature.

9. The computer-implemented method of claim 1, wherein the step of generating the plurality of first features is performed by an application running on either a client computing device or a server computing device.

10. The computer-implemented method of claim 1, wherein the prior version of the plurality of first features is generated based on one or more prior computer-mediated interactions associated with the first user, and the second fingerprint includes less data than the prior version of the plurality of first features.

11. The computer-implemented method of claim 1, wherein the auxiliary information further includes one or more cryptographic signatures generated by at least one of a camera or a microphone associated with the computing device.

12. One or more non-transitory computer-readable media storing program instructions that, when executed by at least one processor, cause the at least one processor to perform the steps of:
   generating a plurality of first features associated with a first user based on video data generated during a computer-mediated interaction between a plurality of users in which the first user included in the plurality of users is represented by an avatar, wherein the plurality of first features is generated based on tracking one or more movements of the first user over time using the video data; and
   verifying an identity of the first user based on the plurality of first features and a prior version of the plurality of first features that is extracted from video data generated during at least one prior computer-mediated interaction associated with the first user and is generated based on tracking one or more prior movements of the first user, by:
   generating a first hash value based on the one or more movements of the first user, wherein the first hash value uniquely identifies the plurality of first features and includes less data than the plurality of first features,
   appending auxiliary information to the first hash value to generate a combined data structure, the auxiliary information comprising a geographic location associated with a computing device used by the first user when the computer-mediated interaction occurs,
   encrypting the combined data structure to generate a first fingerprint, and
   comparing the first fingerprint with a second fingerprint, wherein the second fingerprint uniquely identifies the prior version of the plurality of first features associated with the first user and is generated based on the one or more prior movements of the first user.

13. The one or more non-transitory computer-readable media of claim 12, wherein verifying the identity of the first user comprises computing at least one of a distance or a loss based on the plurality of first features and the prior version of the plurality of first features associated with the first user.

14. The one or more non-transitory computer-readable media of claim 12, wherein the avatar is driven based on at least one of the video data or audio data during the computer-mediated interaction.

15. The one or more non-transitory computer-readable media of claim 12, wherein the identity of the first user is further verified based on at least one of information associated with a computing device belonging to the first user, information associated with a sensor used to acquire the video data or audio data, or a geographical location.

16. The one or more non-transitory computer-readable media of claim 12, wherein the instructions, when executed by the at least one processor, further cause the at least one processor to perform the steps of:
   receiving at least one of the video data or audio data from a first client application; and
   transmitting a notification to a second client application indicating whether the identity of the first user has been verified.

17. The one or more non-transitory computer-readable media of claim 12, wherein the identity of the first user is verified either continuously or periodically.

18. The one or more non-transitory computer-readable media of claim 12, wherein the step of generating the plurality of first features is performed by a first application running on a client computing device, and the step of verifying the identity of the first user is performed by a second application running on a server computing device.

19. The one or more non-transitory computer-readable media of claim 12, wherein the step of generating the plurality of first features is performed by a first application running on a first client computing device, and the step of verifying the identity of the first user is performed by a second application running on a second client computing device.

20. A system, comprising:

one or more memories storing instructions; and one or more processors that are coupled to the one or more memories and, when executing the instructions, are configured to:

generate a plurality of first features associated with a first user based on video data generated during a computer-mediated interaction between a plurality of users in which the first user included in the plurality of users is represented by an avatar, wherein the plurality of first features is generated based on tracking one or more movements of the first user over time using the video data, and verify an identify of the first user based on the plurality of first features and a prior version of the plurality of first features that is extracted from video data generated during at least one prior computer-mediated interaction associated with the first user and is generated based on tracking one or more prior movements of the first user, by:

generating a first hash value based on the one or more movements of the first user, wherein the first hash value uniquely identifies the plurality of first features and includes less data than the plurality of first features, appending auxiliary information to the first hash value to generate a combined data structure, the auxiliary information comprising a geographic location associated with a computing device used by the first user when the computer-mediated interaction occurs, encrypting the combined data structure to generate a first fingerprint, and comparing the first fingerprint with a second fingerprint, wherein the second fingerprint uniquely identifies the prior version of the plurality of first features associated with the first user and is generated based on the one or more prior movements of the first user.

* * * * *